March 3, 1959 — L. M. LANGEFELD — 2,875,816
CHAIR FOR SMALL CHILDREN
Filed April 1, 1955 — 2 Sheets-Sheet 1

INVENTOR.
LOIS M. LANGEFELD
BY
ATTORNEY

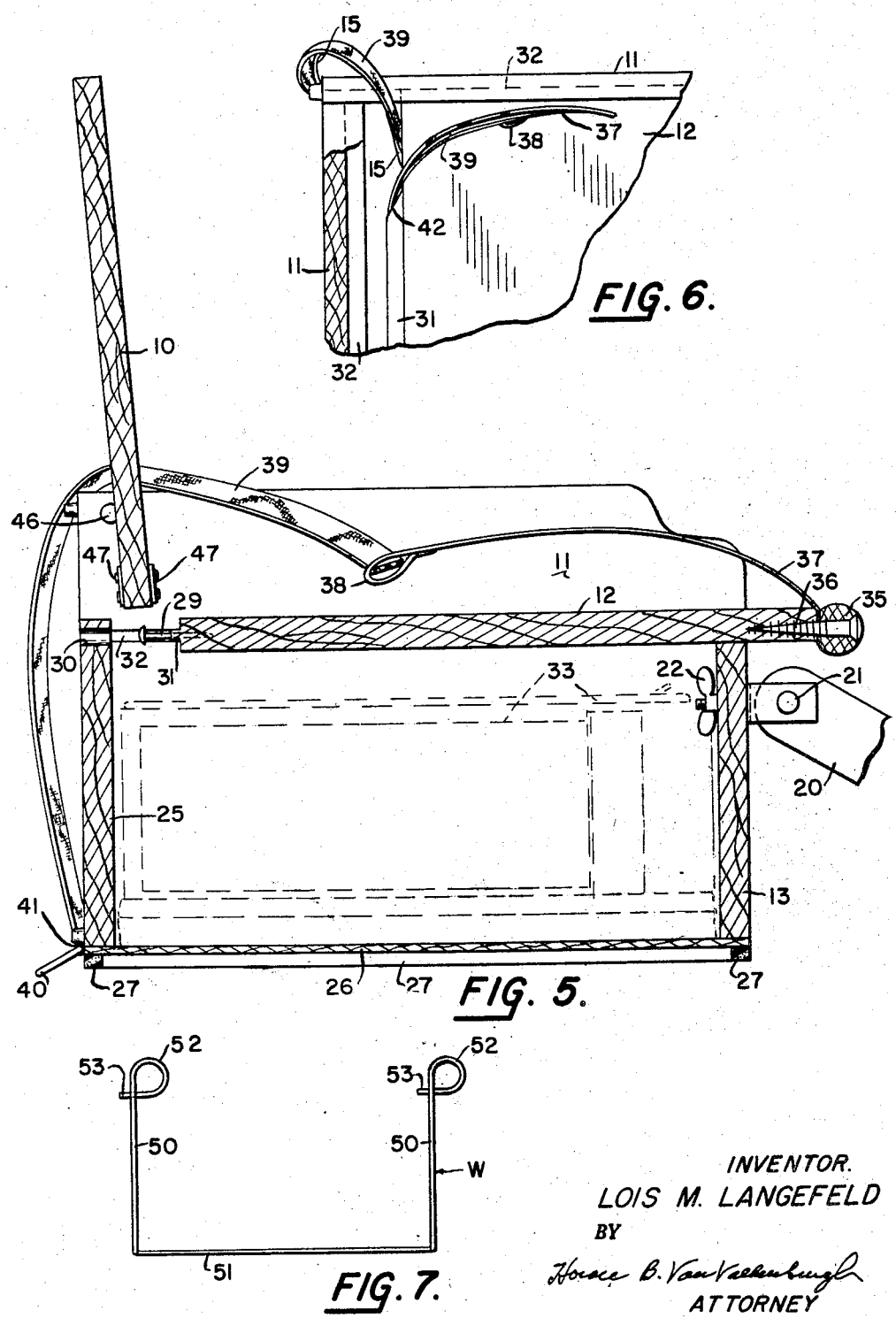

United States Patent Office 2,875,816
Patented Mar. 3, 1959

2,875,816

CHAIR FOR SMALL CHILDREN

Lois M. Langefeld, Denver, Colo.

Application April 1, 1955, Serial No. 498,483

5 Claims. (Cl. 155—131)

This invention relates to chairs, and particularly to chairs for use by small children and infants, such as placed on an automobile seat or the like or on a conventional chair for adults.

The normal chair designed for use by adults has a seat which is not at a desired height for use by small children and infants, while the seats of automobiles are designed for use by adults and a small child or infant, when sitting in the seat, is normally unable to see much of the view outside the automobile. In addition, when a small child or infant is placed in the seat of an automobile, it is highly desirable to prevent the child from being thrown off the seat by sudden deceleration of the automobile. Also, it is desirable to provide in some manner a method of preventing the child from falling off the normal adult chair, particularly a chair ordinarily used at a table, as for dining. Conventional highchairs for small children and infants have a seat which is disposed at a desired height relative to a table, such as a dining table, and is also provided with sides which extend upwardly at each side sufficiently to prevent the child from falling out. However, the normal highchair for small children and infants is rather bulky, cannot be transported readily, and also cannot be used in an automobile. Conventional chairs for infants and small children, especially designed for use in automobiles, are often constructed so that they may be folded up and carried about, but involve considerable inconvenience in setting up and in attaching to the automobile seat. In addition, particularly when traveling in an automobile, it is necessary to carry numerous articles for the child's use, such as bottles containing milk or milk formula, diapers and other accessories. A conventional infant's chair for use in an automobile does not provide a storage space for such articles and it is usually necessary to carry the same in a separate bag or other type of container.

Among the objects of the present invention are to provide a novel chair for children, particularly small children and infants; to provide such a chair which can be used as a seat for the child and may be readily placed on an adult chair or on an automobile seat or the like; to provide such a chair which permits the child to be restrained from falling out of the chair in any direction; to provide such a chair which is readily attached to a conventional adult's chair and also readily attached to an automobile seat or the like; to provide such a chair which forms a space for reception of articles to be used for the child, such as bottles containing milk or milk formula, diapers or other types of clothing and accessories; to provide such a chair which includes a novel device for attaching the same to an automobile seat; to provide such a chair in which access to the storage space is relatively easy; to provide such a chair which is readily carried about by hand; and to provide such a chair which is readily manufactured at a nominal cost.

Additional objects and the novel features of this invention will become apparent from the description which follows, taken in connection with the accompanying drawings, in which:

Fig. 5 is a central vertical cross section, on an enlarged scale, of the chair of Fig 1;

Fig. 6 is a fragmentary top plan view of a portion of a rear corner of the chair of Fig. 5, with certain parts omitted and others shown in partial horizontal section; and Fig. 7 is a top plan view of a wire structure utilized in attaching the seat to an automobile seat or the like.

Figure 1:
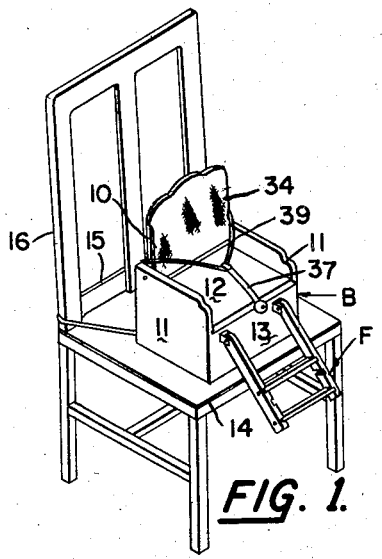
Fig. 1 is a perspective view of a chair for small children, constructed in accordance with this invention and attached to and resting on the seat of a conventional adult's dining chair.

As illustrated in Figs. 1 to 4 inclusive, a seat for small children, constructed in accordance with this invention, may include a box-like structure B having a seat back 10 pivotally attached to the upper portion thereof, as between the sides 11 which extend upwardly at each side above a slidable top 12, while a foot rest F is pivotally attached to the front 13 of the box structure B. As in Fig. 1, the child's chair may rest on the seat 14 of a conventional adult's dining chair and be attached to the adult's chair by a strap 15 which is adjustable in length and which extends around the back 16 of the adult's chair, while the foot rest F extends forwardly and downwardly, resting on the front edge of the seat 14 of the adult's chair. When placed on the seat 17 of an automobile, as in Fig. 2, a wire structure W is utilized in attaching the child's chair securely to the automobile seat, conveniently extending between the automobile seat 17 and the back 18 therefor. The foot rest F again extends forwardly from the box structure B and rests on the edge of the automobile seat 17.

Figure 3:
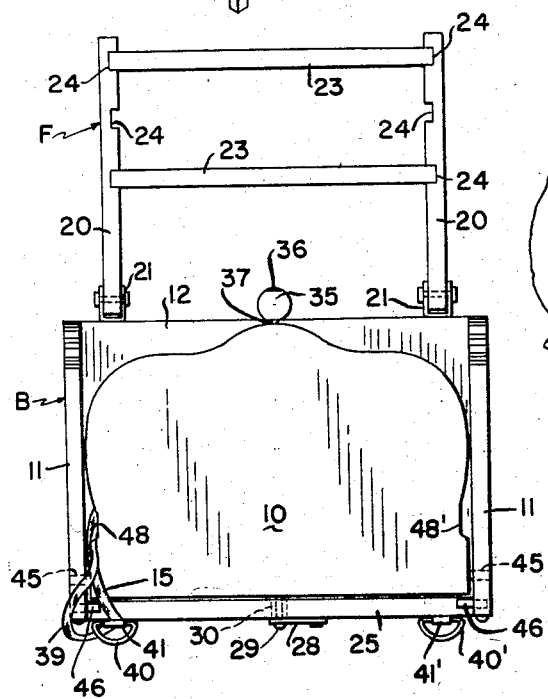
Fig. 3 is a side elevation of the chair of Fig. 1, on an enlarged scale, in position for carrying.
Figure 4:
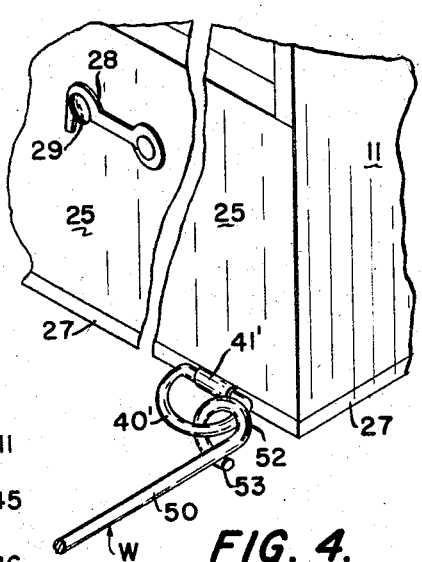
Fig. 4 is a condensed, fragmentary perspective view of a portion of the rear of the chair of Fig. 1, on a further enlarged scale.

As illustrated in Fig. 3, the seat back 10 is adapted to be folded down against the top 12 and the foot rest F to extend upwardly in a vertical position for use as a handle for carrying the seat of this invention. This is a valuable feature of the present invention, since the foot rest F not only acts as a foot rest during normal use, but also is an excellent handle for carrying purposes.

The foot rest F may include a pair of side bars 20 which extend in spaced parallel relation from pivot brackets 21, removably attached to the front 13 of the box structure B, as by bolts having wing nuts 22 on the inside of box B, as in Fig. 5. One or more rails 23, such as two, as shown, may extend between the side bars 20 and be attached thereto in a suitable manner, as by the ends of the rails 23 being inserted in grooves 24 formed in the side bars 20 and screws (not shown) extending through the side bars and into the rails. If desired, one or more additional grooves 24 may be provided in each of the side bars 20, so that the rails 23 may be placed at different positions in accordance with the length of the legs of the child normally using the chair.

As in Fig. 5, the box structure B may include not only the sides 11, top 12 and front 13, but also a back 25 and a bottom 26, these parts being formed of wood, plywood or other suitable material. The bottom 26 of the box B, as in Figs. 4 and 5, may be provided with a strip 27 of rubber or the like, which extends around the edges of the underside thereof, to prevent damage to or slippage on a chair seat, automobile seat or the like when the child's seat rests thereon. Also, the top 12 of the box B may be locked in position by a latch 28 which is attached to the back 25 of the box B and is adapted to engage a pin 29, such as a screw or other suitable projection having a head, to prevent the top 12 from moving forwardly when locked, the pin 29 conveniently extending through a small hole 30 in back 25 when the top 12 is in closed position, as will be evident from Fig. 4.

The front 13 of box B extends up to the top 12, while the top 12 may be provided around three sides with a flange 31 adapted to engage grooves 32 formed in the sides 11 and back 25. As shown, articles 33, such as a heat insulated container for bottles, adapted to contain milk or a milk formula, diapers, toys and other accessories or apparel, as well as a pad 34 for the seat back 10 (shown on back 10 in Fig. 1) and a similar pad (not shown) for top 12, may be stored in the space within the box structure B, access thereto being provided by sliding the top 12 forwardly, the top 12 being shown in Fig. 5 as just slightly open. To facilitate movement of the top 12, a knob 35 or other suitable handle, which does not tend to interfere with the use of the seat, may be attached to the front edge of the top in a central position, as by a screw 36 by which a strap 37 is also attached to the front of the top 12. Strap 37 may be provided with a loop 38 at its rear end through which a strap 39 passes, the latter being adjustable in length. Strap 39 may be separate from or a continuation of the strap 15, and each may be attached to one of the lower rear corners of the box B, as by being clamped by the attachment by which a pivoted link 40, such as a D-ring, is also attached, as by bracket 41. Adjacent the opposite lower rear edge of the box B, as in Fig. 3, a similar ring 40' is attached by a bracket 41', the rings 40 and 40' cooperating with the wire structure W in a manner described later, while the ring 40' also cooperates with straps 15 and 39 in attaching the chair to the adult's chair and attaching the child to the chair. Thus, the child's chair may be placed on the adult's chair, as in the position of Fig. 1, and the child seated on the top 12 with the seat back 10 moved to its rear position. The front strap 37 extends between the child's legs, while the strap 39 is passed around the midriff of the child, extending through the loop 38 of strap 37, and then downwardly to the ring 40', the end of strap 39 conveniently being provided with a snap hook for removable attachment to ring 40'. Strap 15 is adjusted to length, passed around the back of the adult's chair and the free end thereof attached to ring 40', as by a snap hook. For removing the child, it is necessary only to undo or loosen the portion of strap 39 which extends across the child's midriff, so that the child may be lifted therefrom. When the straps are used in securing the child to the child's seat when placed on an automobile seat, the strap 39 again may be passed through loop 38 and then attached to ring 40', to hold the child in place, as before.

The free ends of straps 15 and 39 are also adapted to be placed within box structure B, as will be evident from Fig. 3, so that the straps will not hang loose. For this purpose, as in Fig. 6, a portion of flange 31 may be cut away, as to an end 42 of the rear flange 31, to provide a small aperture through which the fixed straps may extend, when stored. In addition, a pad for the top 12 and also pad 34 for the seat back 10, the latter conveniently having a pouch formed along the upper edge so that it may be slipped over the seat back, as in Fig. 1, and thus stay in position, may be stored in the space within the box B, particularly when the seat back 10 is folded down onto seat 12 for carrying.

The seat back 10 is pivoted at its lower end between the sides 11 of the box B, as by pins 45 of Fig. 3, while the sides 11 may be provided with inwardly extending stop pins 46, as in Figs. 3 and 5, to limit rearward movement of the seat back 10. Each lower corner of the seat back 10 may also be reinforced by a plate 47, as on each side, as shown in Fig. 5, to prevent the pivot pins 45 from splitting out through the wood of the seat back. The seat back 10 may also be provided with an indentation 48 at a position just above the top of the side 11, particularly above the corner at which ring 40 is located, so that when the seat back is folded to the position of Fig. 3, the straps 15 and 39 will be received freely in the space formed between the seat back 10 and the adjacent side 11 and thus will not tend to wedge between the seat back and the side when the former is pivoted against the top 12. For symmetry in appearance, an indentation 48' may be provided at the opposite side of the seat back 10, although the indentation 48' is not necessarily functionally useful, as is the indentation 48.

Figure 2:
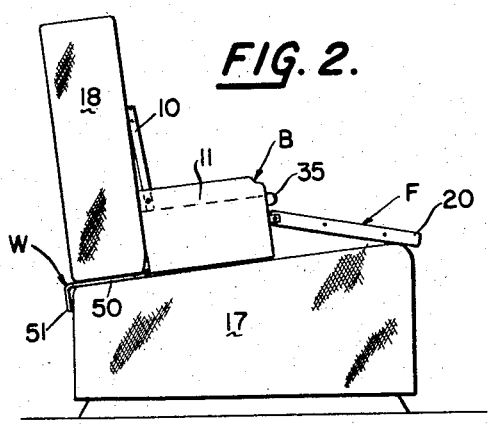
Fig. 2 is a side elevation of the chair of Fig. 1, attached to and resting on an automobile seat.

The wire structure W, which is particularly adapted to cooperate with the rings 40 and 40' in attaching the child's seat to an automobile seat, may be formed from suitable wire or rod material and provided with sides 50 which extend forwardly from each end of a rear rod 51, which is offset in a direction substantially perpendicular to sides 50, so as to engage the rear side of an automobile seat 17, as in Fig. 2, or the rear side of the automobile seat back 18. The end of each side 50 is provided with a hook 52, which curves arcuately and concurrently upwardly or downwardly so that the extreme end 53 will point generally transversely to the side 50 but will be offset therefrom so that the ring 40 or 40' will slip readily through the space between the side 50 and the end 53. Preferably, the end 53 of each of the hooks extends in the same direction, as in Fig. 7, so that the ends of the hooks may merely be placed in the rings 40 and 40' and the wire structure W moved sideways to cause the hooks to engage the rings. Although the hooks at the ends of the wire structure W are slipped in and out of the rings 40 and 40' rather readily, the same requires the rear end of the box B to be tipped upwardly, so that as long as the child is in the seat, the wire structure W and the box B will not be disengaged.

From the foregoing, it will be evident that the seat for small children of this invention fulfills to a marked degree the requirements and objects hereinbefore set forth. The provision of a pivoted seat back which may be moved forwardly to a position against the remainder of the seat, in combination with the pivoted foot rest which may also be utilized as a handle for carrying the seat, contributes considerably to the facility with which the seat may be used and moved from place to place, as desired. The provision of a box-like structure which forms a space for receiving desired articles to be stored therein, as well as the loose portions of the straps by which the child may be held in the seat and which also may be used in attaching the seat to an adult's chair or the like, contributes further to the usefulness thereof. A slidable top for the box structure, which is preferably locked in closed position and on which the child sits when the seat is in use, permits the box structure to be relatively rigid and does not produce undue inconvenience in obtaining access to the storage space. For instance, if a diaper is to be changed, the child must be removed from the seat in any event. Also, if the child is to be fed from a bottle, the child will normally be removed from the seat. Furthermore, access to the storage space can be obtained while the child remains seated by detaching or loosening the strap 39 and pulling the top 12 forwardly with the child sitting thereon, then reaching behind the child and into the storage space. Since the rings 40 and 40' are disposed slightly inwardly from the ends of the box B, the wire structure W has a width which permits it to be placed in the storage space when not in use. The provision of both a seat back and a foot rest adds additional comfort to use of the seat by the child, thus helping to eliminate restlessness during meal time. The foot rest may, of course, be removed and the seat placed on the floor so as to form a small chair for use by the child, or as a step stool. In such event, the rubber strips 27 restrain the seat from moving about the floor. The exterior surfaces of the seat may also be painted or otherwise treated to provide a suitable appearance.

Although a specific embodiment of this invention has been illustrated and described, it will be understood that variations may be made therein and that other embodiments may exist, all without departing from the spirit and scope of this invention.

What is claimed is:

1. A chair for small children adapted to be placed on an adult sized chair or an automobile seat and the like, comprising a box-like structure having a bottom, sides, a front, a back and a top, said sides extending above said top and said top being mounted for sliding movement between said sides and forwardly to provide access to the interior of said structure; a latch for maintaining said top in closed position; a seat back pivotally mounted between said sides adjacent the rear thereof and movable to a position overlying said top, said sides of said structure having stops to limit rearward pivotal movement of said seat back; a first strap attached to the front of said top at a central position; and a second strap adjustably connected with the rear of said first strap, said second strap being attached to the rear of said box structure.

2. A chair for small children, as defined in claim 1, including a third strap fixed at one end to the rear of said structure adjacent one side thereof and removably attached at the opposite end to the rear of said structure adjacent the opposite side thereof; wherein said second strap is fixed at one end to the rear of said structure adjacent one side thereof and removably attached at the opposite end to the rear of said structure adjacent the opposite side thereof; and wherein said structure is provided with an aperture for passage of said second and third straps to the interior of said structure for storage of the free ends therein.

3. A chair for small children, as defined in claim 2, wherein said seat back is provided with an indentation to form an aperture for passage of said second and third straps to the interior of said structure with said back overlying said top of said structure.

4. A chair for small children, adapted to be placed on an adult sized chair or an automobile seat and the like, comprising a box-like structure having a bottom, a front, a back, a top and sides extending above said top, said top being provided with outwardly extending flanges on three sides thereof and said back and sides being provided with cooperating grooves for sliding movement of said top between said sides and forwardly to provide access to the interior of said structure; a resilient strip attached to and extending around the edge of said structure bottom; a latch on the rear of said structure back for maintaining said top in closed position, said top having a rearwardly extending pin provided with a head for engagement with said latch and said structure back having a hole through which said pin extends with said top in closed position; a seat back; pins pivotally mounting said seat back between said sides adjacent the rear thereof, said seat back being movable to a position overlying said top and said structure sides having inwardly extending stops to limit rearward pivotal movement of said seat back; a forwardly extending handle attached to the front edge of said structure top at the center thereof; a first pair of brackets attached to said structure back adjacent the respective lower corners thereof; a ring pivotally mounted in each said first bracket; a second pair of brackets removably attached to the front of said structure in spaced positions adjacent the upper edge of said front; a foot rest including a pair of parallel side bars pivotally mounted at the rear end thereof on said second brackets and a plurality of cross rails attached to and extending transversely between said side bars, each said side bar being provided with longitudinally spaced grooves to receive the ends of said cross rails and at least one additional groove for receiving the end of one cross rail when shifted to a different position; a first strap attached to the front of said top by said handle and having a closed loop at the rear end thereof; a second strap passing through said loop at the rear of said first strap, one end of said second strap being attached to the rear of said structure at a lower corner thereof by the bracket for one ring and removably attached to the other said ring; and a third strap attached at one end to said bracket for said one ring and removably attached to said other said ring, said rear flange of said structure top being cut away at one end to provide a space through which said second and third straps pass when the free ends thereof, disconnected from the other said ring, are stored in the interior of said structure, said seat back having an indentation in a side which forms a space at said structure side and through which said second and third straps pass when so stored, said flange cut away and said seat back indentation being at the same side of said seat as said one said ring bracket by which said second and third straps are attached.

5. A chair for small children, as defined in claim 4, wherein said third strap is a continuation of said second strap.

References Cited in the file of this patent

UNITED STATES PATENTS

| | | |
|---|---|---|
| 1,163,628 | Gibson | Dec. 7, 1915 |
| 1,967,533 | Koop | July 24, 1934 |
| 1,984,207 | Ceslowitz | Dec. 11, 1934 |
| 2,073,065 | Kahn | Mar. 9, 1937 |
| 2,089,090 | Giacomo | Aug. 3, 1937 |
| 2,317,894 | Doty | Apr. 27, 1943 |
| 2,324,421 | Ouellette | July 13, 1943 |
| 2,347,754 | Shay | May 2, 1944 |
| 2,357,214 | McDole | Aug. 29, 1944 |
| 2,461,123 | Miller | Feb. 8, 1949 |
| 2,489,087 | Hewit | Nov. 22, 1949 |
| 2,630,161 | Richter et al. | Mar. 3, 1953 |

FOREIGN PATENTS

| | | |
|---|---|---|
| 365,828 | Germany | Nov. 4, 1920 |